Dec. 2, 1930.  T. PATOCKA  1,783,307
PROTECTED DIRECTIONAL SIGNAL
Filed Feb. 4, 1929
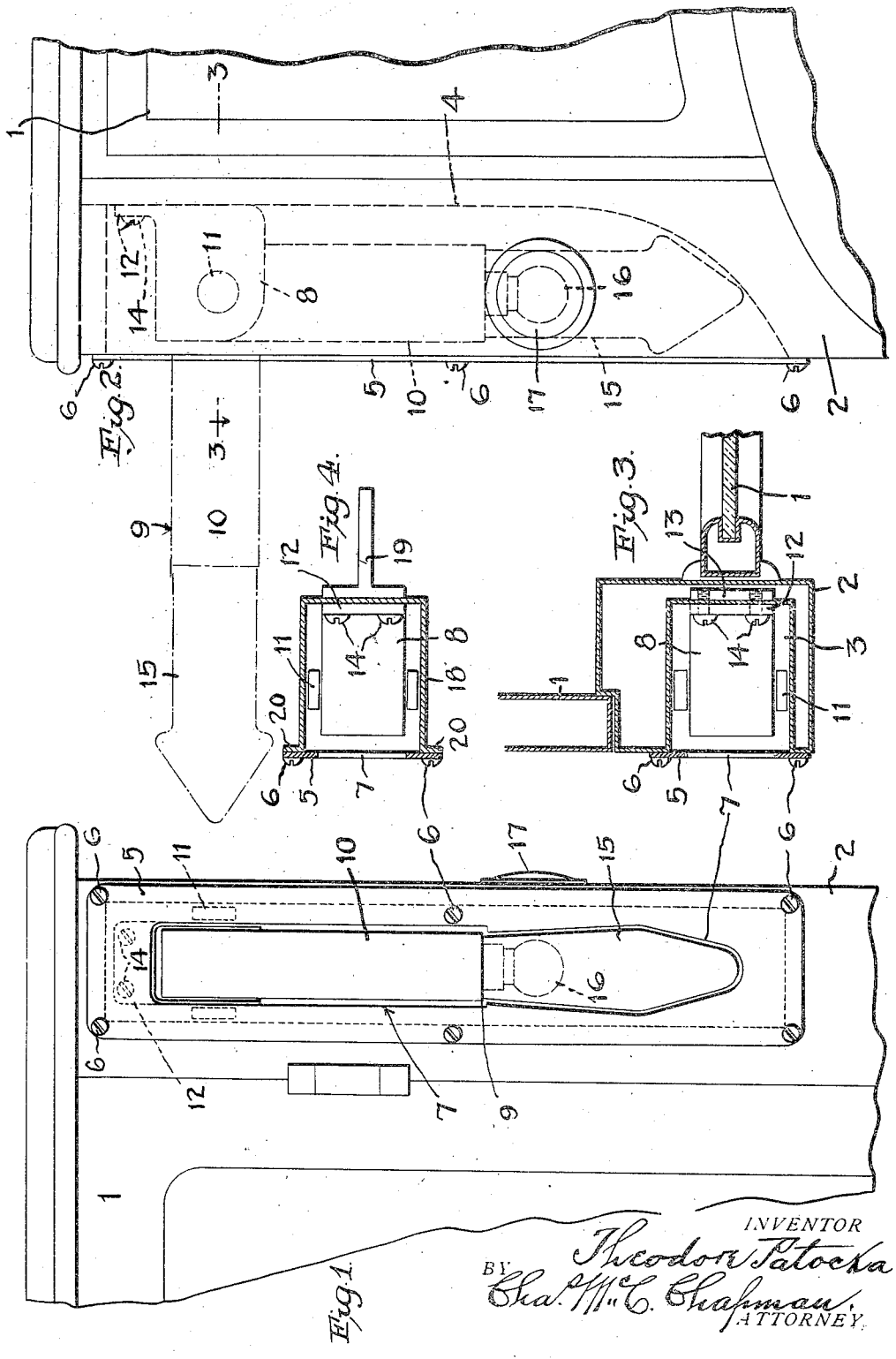

Patented Dec. 2, 1930

1,783,307

UNITED STATES PATENT OFFICE

THEODORE PATOCKA, OF COLLEGE POINT, NEW YORK, ASSIGNOR TO THOMAS R. BROOKS, OF SCRANTON, PENNSYLVANIA

PROTECTED DIRECTIONAL SIGNAL

Application filed February 4, 1929. Serial No. 337,322.

This invention has reference to the art of signaling and, particularly, relates to a directional signal for automobiles and similar road vehicles.

Among the objects of my invention may be noted the following: To provide a signal for road vehicles of the directional type which can also be utilized as a parking light; to provide a directional signal of the semaphore type which, when not in use, is housed or concealed in some part of the vehicle; to provide a signal of the semaphore type which may be attached to any part of an automobile and which embodies in its construction a sheathing, closure or guard frame which not only protects the signaling devices, but can be inserted in a receptacle or recess formed in the vehicle body or some part or member thereof; to provide a signaling device for directional purposes which is applicable to an automobile or similar road vehicle, and which embodies a swinging arm, an electric light or signal operable simultaneously with the swinging of the arm, and which, when not in use, is discernible so as to enable it to be used as a warning, signal or safety light for parking purposes, thus avoiding the necessity for igniting or burning special lights on various parts of the vehicle; and to provide a signaling device of the character noted in the foregoing which, when applied to the vehicle, is entirely housed, concealed, and protected from the elements, from being tampered with, or from being injured by contact with outstanding obstructions which might be encountered either in traveling or when approaching the curb or upstanding features of construction usually encountered on sidewalks or buildings.

With the above objects in view and others which will be detailed during the course of this description, my invention consists in the parts, features, elements and combinations thereof hereinafter described and claimed.

In order that my invention may be clearly understood, I have provided drawings wherein:

Figure 1 is a view showing my invention applied to the body of the road vehicle, the latter being shown only in small part and in side elevation;

Figure 2 is a view showing my invention applied to the wind-shield post of a motor vehicle, the parts being shown in front elevation with a dotted line representation of my signal arm in two positions;

Figure 3 is a sectional view taken on the line 3—3 of Figure 2, the direction of sight being indicated by the arrow; and Figure 4 is a view similar to Figure 3 of my invention showing the same incased in an independent sheath or housing.

Referring to the drawings, the numeral 1 indicates generally some part of a road vehicle. It may be the body at the point carrying a hinged door, or it may be the wind-shield with its outstanding post indicated at 2. In either case, the vehicle has my signaling arm applied thereto within a receptacle, recess or niche so as to shield the arm, as indicated in Figure 3 at 3, and in Figure 2 by the dotted line 4. As shown in the figures, the open side of the recess or receptacle for the arm is closed by a detachable plate 5, through the medium of several removable screws 6 passing therethrough and into the body of the vehicle. The removable plate 5 is provided with an opening or window 7 through which my signaling arm can be observed and will operate when actuated through any suitable medium desirable. The opening or window 7 is given the form or outline of the facial portion of the signal.

As shown in Figures 1 to 3, inclusive, my signaling arm consists of a bracket 8 provided with a shaft on which the arm 9 swings, said arm consisting of a tubular portion 10 which swings on the pivotal pin 11 supported by the bracket, the latter being fixed within the recess 3 by means of a suitable clamp consisting of the ear 12 of the bracket and a plate 13 applied to the rear wall of the recess, several screws 14 being applied for holding the bracket rigidly in position. The outer end 15 of the signaling arm 9 is made of some light weight, translucent material through which the light from the electric bulb 16 may pass, and which will be entirely illuminated so as to be readily observed in the night when the arm is swung into position as shown in Figure 2, and which may also be seen through the window 7 of the detachable plate 5. The translucent end of the signal arm may be given any shape desired, it being understood that the shape shown is not to be taken as a limitation; but, merely as an example of a form which may be employed effectively.

To enable my signaling device to be employed as a parking light or danger signal, a bull's-eye lens 17 is set in one side of the housing or wall of the receptacle so that the light from the bulb 16 may shine therethrough. Obviously, the said bull's-eye can be set in the housing on any side of the latter found effective for the purposes mentioned.

As shown in Figures 1 to 3, inclusive, the signaling device is shown as applied to the side body of the car or the wind-shield post, so that it may be readily seen from the rear by the driver of a following car; that is to say, the arm is so mounted that it can be swung through the window of the receptacle at a right-angle to the body of the car to indicate the direction of movement of the car carrying the signal. At night, the bulb 16 will be in circuit so that the translucent end of the signaling arm will be readily observed. If the car is parked, or comes to a standstill, the glare from the bulb 16 will be readily observed from the rear through the bull's-eye 17. It will, of course, be understood that my signaling device can be applied to any part of the car desired; that it can be operated by impulses from the engine of the car, by an electric motor, such as solenoid means, and that the light carried by the signal arm may be in the battery circuit of the car or an independent circuit. Control of the arm as to its projection into sight or view may be had through medium of a switch applied to the steering post or steering wheel of a motor vehicle. These various parts, devices and mechanisms are not shown, since they form no part of my invention, are merely suggestive, and in most part are well known in the art.

Instead of housing my signaling device either in the body of the car or in the wind-shield post, I may apply the arm directly to the car body or wind-shield post in any desired position and in any desired manner. To this end, I have shown in Figure 4 a form of my invention wherein the bracket 8 and the signaling arm carried thereby are located in a housing or sheath 18, which is independent of any part of the vehicle to which it may be attached, and by a suitable bracket 19, which is in turn clamped to the rear wall of the housing 18 through the medium of the ear 12, of the bracket 8 and screws 14. The sheath or housing 18 is provided with outturned flanges 20, to which is applied the detachable plate 5 by means of screws 6, which has the opening 7, through which the signaling arm operates, the same as in the forms of my invention shown in Figures 1 to 3.

From the foregoing it will be seen that, in both forms of my invention, the signaling arm is entirely incased and protected, and that it may be projected for signaling purposes into view through the window 7 of the detachable plate 5. If the form of my invention shown in Figure 4 is employed, it may be applied to the outside of the car or wind-shield post in any position desired, or it may be inserted in the recess or niche shown in the drawings. The signaling arm is returned to position within the sheath or casing gravitally. In both forms of my invention, the window in the face-plate takes the outline of the signaling arm, whatever that may be, so that it will swing freely outwardly and inwardly through said face-plate. In both forms of my invention, the bull's-eye is also applied to the casing or sheath, so that the light of the bulb carried by the arm may be utilized as a rear signal, danger signal, or parking light. In all forms of my invention, the face-plate 5 is a guard for the signal arm and prevents tampering with the same; and the arm is also protected from the elements, since the opening in the face-plate is no larger than necessary. However, should moisture collect inside the niche or sheath, it will drain to the bottom thereof, where it can be released by loosening one or both of the lower screws.

Having thus described my invention, what I claim and desire to secure by Letters Patent is:

In combination with a signal arm of predetermined shape, a casing for housing said arm having a face-plate with an opening the shape of the arm through which the latter may be swung, a bull's-eye secured to the casing in the side thereof at an angle to the face-plate and at the lower end of the casing, a translucent member carried by the signal arm at its outer end, a lamp carried by said arm and projecting into said member and located opposite said bull's-eye, whereby when the arm is in its casing the lamp will show through the bull's-eye, and when the arm is swung through said opening the lamp will show through said member.

THEODORE PATOCKA.